United States Patent [19]

Lewis

[11] Patent Number: 5,660,453
[45] Date of Patent: Aug. 26, 1997

[54] LIGHTING SYSTEM

[76] Inventor: Gordon C. Lewis, 6824 Chapel La., Edina, Minn. 55439

[21] Appl. No.: 325,697

[22] Filed: Oct. 19, 1994

[51] Int. Cl.$^6$ ......................................................... F21V 8/00
[52] U.S. Cl. ........................... 362/32; 362/812; 362/431; 362/183
[58] Field of Search ........................... 362/32, 812, 431, 362/183; 40/612

[56] References Cited

U.S. PATENT DOCUMENTS

| | | | |
|---|---|---|---|
| 2,354,367 | 2/1944 | Ford . | |
| 2,652,650 | 9/1953 | Helms | 362/812 |
| 4,422,719 | 12/1983 | Orcutt | 350/96.3 |
| 5,042,894 | 8/1991 | Swemer | 385/33 |
| 5,134,550 | 7/1992 | Young | 362/32 |
| 5,161,874 | 11/1992 | Benes | 362/32 |
| 5,257,168 | 10/1993 | Davenport et al. | 362/32 |
| 5,303,125 | 4/1994 | Miller | 362/32 |

OTHER PUBLICATIONS

8–page brochure "Standard Specificaitons for Structural Supports for Highway Signs, Luminaries and Traffic Signals" American Association of State Highway and Transportation Officials, 1994.

3–page brochure from Lumenyte International Corporation, Apr. 1993.
Exhibit A Minnesota Dept. of Transportation, Specification pp. 762–767 (Jul. 1, 1995).
Exhibit B Missouri Dept. of Transportation Specification pp. 578–583 (Jan. 8, 1993).
Exhibit C Wisconsin Dept. of Transportation Specification pp. 502–503 (1989).
Exhibit D Illinois Dept. of Transportation Specification pp. 1006–1008.
Exhibit E Traffic engineering Manual pp. 8–8.03.01 (1993).
Exhibit F ASTM Specification pp. 508–512 (1995).

*Primary Examiner*—Ira S. Lazarus
*Assistant Examiner*—Alfred Basichas
*Attorney, Agent, or Firm*—Merchant, Gould, Smith, Edell, Welter & Schmidt

[57] ABSTRACT

A lighting system for reflectively surfaced overhead highway signs includes a light source remote from the reflective sheeting surface of the signs. Fiber optics conduct light from the light source to a position in front of the reflective surface. Brackets mount to panel mounting posts of the signs and support the ends of optical fibers to direct light for optimal lighting of the reflective surface. A focusing lens may be positioned at the end of the optical fiber for narrowing the light beam for narrower lighting of the sign.

18 Claims, 8 Drawing Sheets

LIGHTING SYSTEM

BACKGROUND OF THE INVENTION

1. Field of the Invention

The present invention is directed to an apparatus for lighting highway signs, and in particular to remote fiber optic lighting apparatus for the illumination of reflective sign faces on overhead highway sign structures.

2. Description of the Prior Art

The importance of lighting highway signs to aid in navigation and for safety concerns cannot be over emphasized. Overhead highway signs are made with panels surfaced with reflective sheeting, such as manufactured by Minnesota Mining and Manufacturing Corporation of St. Paul, Minn. Reflectively surfaced signs are used worldwide and provide for improved visibility, especially at night. Signs placed along the side of the road, such as in two lane roads, do not need to be lighted as they generally fall within the range of most vehicles' headlights. However, with multiple lane roads, overhead signs are often required. These signs must be placed high enough to allow traffic to proceed safely under the sign and therefore generally are not well lit by most vehicles' headlights. The problem is greater when low beam headlights are used. Therefore, at night, and during other periods of poor weather, the signs must be illuminated.

Typical overhead sign lighting currently used is very cumbersome and requires much maintenance. Overhead sign structures include types known as sign bridge, cantilever, sign bridge cantilever, balanced butterfly, unbalanced butterfly, structure mounted sign, or more broadly sign support structures. Structure mounted signs are signs fastened to structures mounted on bridge overpasses. Standards for these signs are provided by the American Association of State Highway and Transportation Officials (AASHTO) and their publication entitled "Standard Specifications for Structural Supports for Highway Signs, Luminaries and Traffic Signals." The large light fixtures presently used for illumination require added structural components for their support which adds to the weight and cost of the underlying structure. Standards are also provided for the additional structural members to service the lights, such as catwalks for workers replacing the lamp bulbs. Performing maintenance causes an interruption in traffic because of traffic lane closures while maintenance is being performed. Due to the expense involved and the problems with closing lanes to perform maintenance, proper maintenance will often not be performed, resulting in signs which are not illuminated and often remain dark for extended periods of time. Such lack of illumination is hazardous and inconvenient to motorists. This situation is common throughout the world.

Efforts to overcome the shortcomings of lighting reflective signs panels have not been entirely successful. Light emitters, having tubular arrangements with light extending toward the signs, may provide adequate lighting for the reflective signs panels, but still require structure for supporting the light emitting tubes. In addition, the tubes require maintenance of the light source which is placed next to the sign, so that ladders or catwalks must be used to allow workers near the sign faces.

It can be seen then that an apparatus is needed which provides adequate lighting for reflectively surfaced sign panels. It can be further appreciated that such an apparatus should provide for servicing from ground level and for reliable lighting requiring minimal maintenance. Such an apparatus should also provide for the elimination of catwalks and other structures required for maintenance of the lighting. The present invention addresses these as well as other problems related to lighting reflectively surfaced sign panels.

SUMMARY OF THE INVENTION

The present invention is directed to a lighting system for overhead reflectively faced signs. In particular, the invention is directed to an illumination system which utilizes Large Core Plastic Optical Fibers (LCPOF). According to the present invention, LCPOF relay light from a remote illumination source near the ground to a position proximate the reflective surface of the sign panel. Light emanates from an emitting end which spreads light outward and over the reflectively surfaced sign panels.

Proximate the sign, a bracket is used to position and support the emitting end of the LCPOF. In this manner, no additional heavy support structure is needed such as was necessary to support and service the presently used large light fixtures. This also eliminates the need for changing bulbs and maintaining light fixtures so that no catwalks are needed. Furthermore, any maintenance which needs to be performed on the light source is not performed near the sign and over traffic.

The lighting source normally is located in a weather resistant box proximate the ground at the side of the road. It provides for lighting an accepting end of the LCPOF or multiple LCPOF in a harness which then transports the light upward and toward the reflectively surfaced sign panel.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENT(S)

Figure 1:
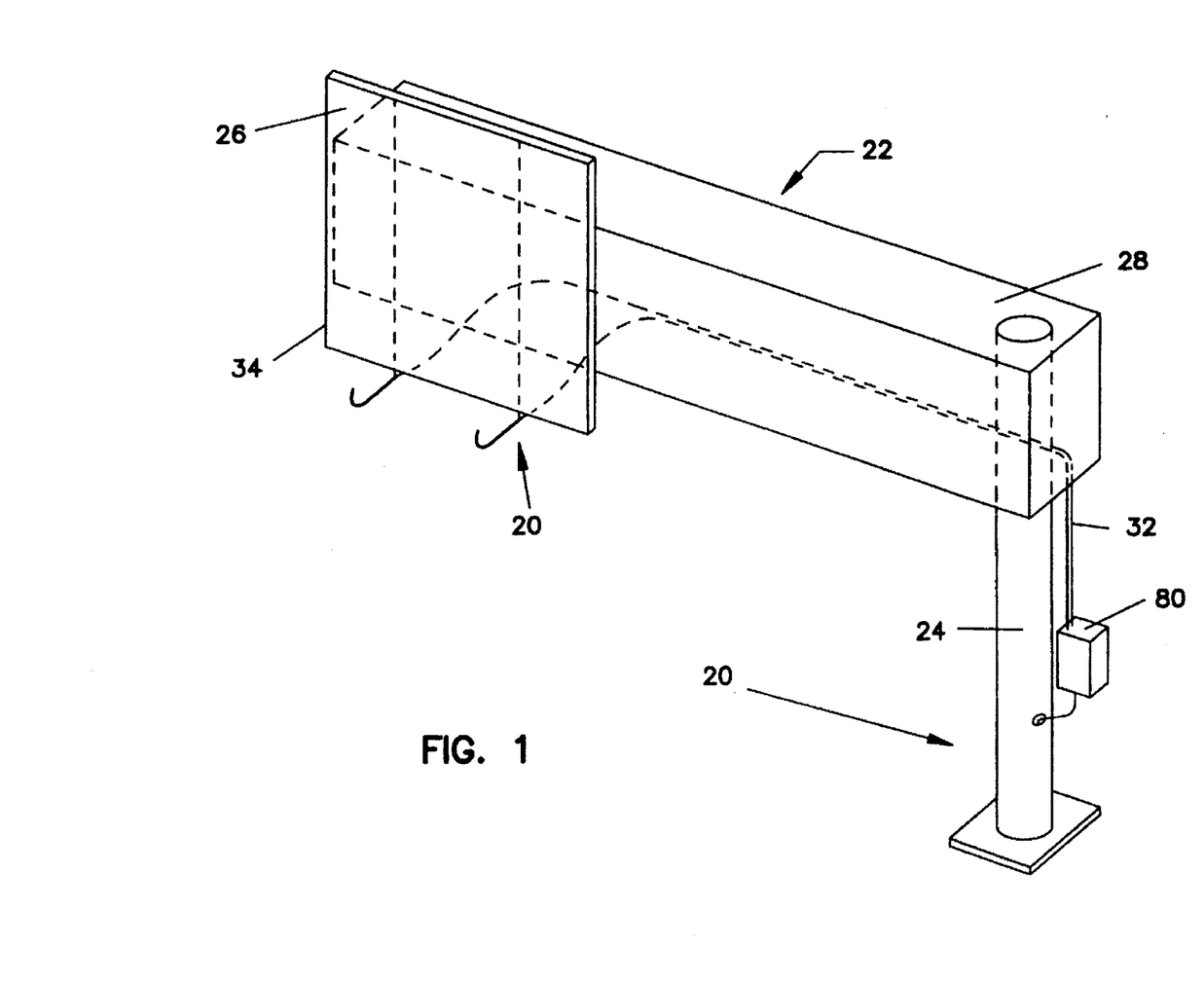
FIG. 1 shows a front perspective view of an overhead sign and a lighting system according to the principles of the present invention.
Figure 2:
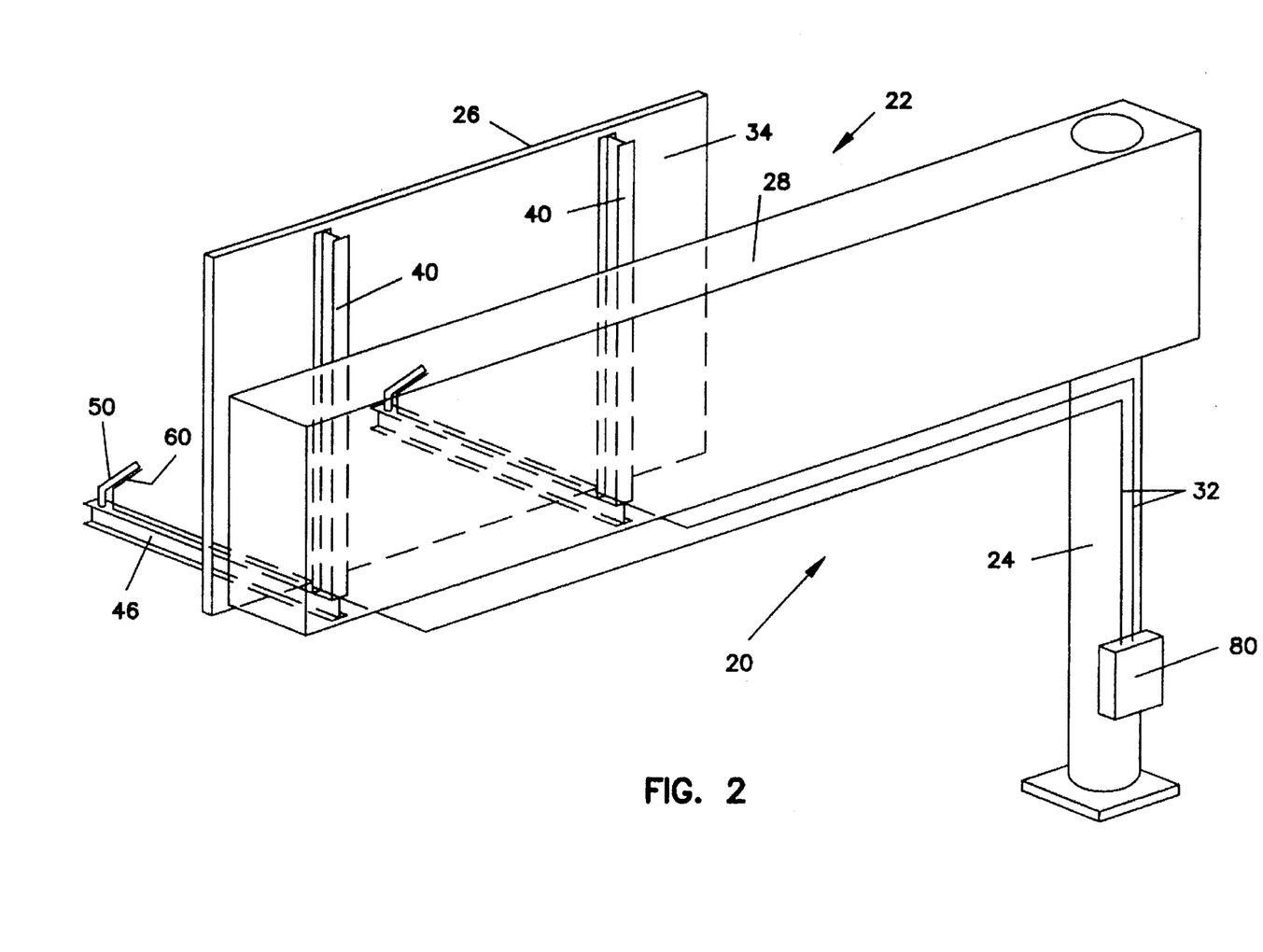
FIG. 2 shows a rear perspective view of the overhead sign and lighting system shown in FIG. 1.

Referring now to the drawings, wherein like reference numerals designate corresponding structure throughout the views, and referring in particular to Figures 1 and 2, there is shown a remote lighting system, generally designated 20 used for lighting an overhead sign structure, generally designated 22. Although the sign structure 22 shown is of a cantilever design, it can be appreciated that other types of support structures may be used including sign bridges, butterflies, and signs mounted to structures such as bridges, as well as variations of these basic designs. Such overhead highway signs generally include a sign portion which is a panel surfaced with reflective sheeting 26. The sign panel 26 typically has a background of a first color and legends of a second contrasting color for improved visibility. The reflectively surface panel 26 will normally be fastened to panel mounting posts 40 which in turn will be mounted on a truss or similar supporting structure 28 which is attached to a sign column or post 24 or may be attached to a bridge or other structure (not shown) in other configurations. In addition, several signs may be mounted on a single structure. A light source in a housing 80 is located remote from the reflectively surfaced panel 26 and includes a fiber optic bundle 32, having one or more optical fibers, extending from the light source to an illumination position. The fiber optic bundle 32 leads to a lighting position in front of the reflective sheeting panels 26 for illuminating the sign, as explained hereinafter.

Figure 3:
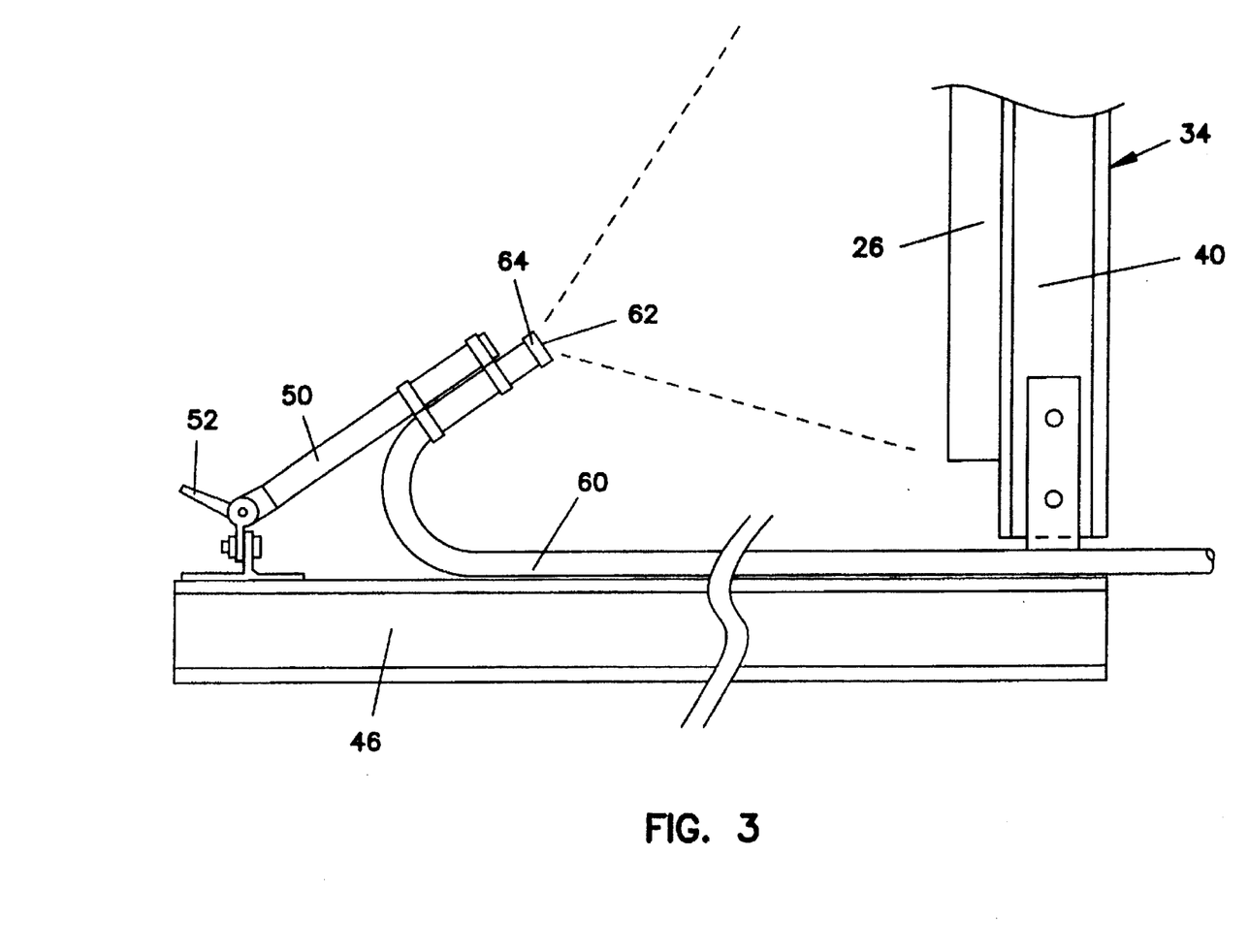
FIG. 3 shows a side elevational view of an overhead sign equipped with the lighting system shown in FIG. 1.

As shown in FIG. 2, the reflectively surfaced panel 26 is generally fabricated from aluminum extrusions or from aluminum sheet surfaced with reflective sheeting and overlaid with appropriate legends. The panel is attached on its reverse side to structures commonly known as panel mounting posts 40 in typical sign construction. The panel mounting posts 40 secure to the structural elements of the overhead sign. The panel mounting posts 40 mount to the rear of the sign panel 26, providing rigidity to the sign panel 26. The panel mounting posts 40 are sufficiently rigid to provide for attachment of a bracket 46 for supporting a large core plastic optical fiber (LCPOF) 60. Referring to FIG. 3, the bracket 46 includes a lower horizontal portion extending outward from the reflective sign panel 26, as well as an adjustable portion 50 which may be angled to direct an emitting end 62 of the large core plastic optical fiber to a proper lighting position. An adjustment handle 52 provides for easy adjustment and in the preferred embodiment includes burled surfaces which may be tightened down to lock the adjustable portion 50 at a preferred setting. The large core optical fiber 60 includes an emitting end 62 which has light shining therefrom and the preferred embodiment includes an endcap 64 which protects the end of the LCPOF from the elements while allowing light to emit therefrom.

Figure 9:
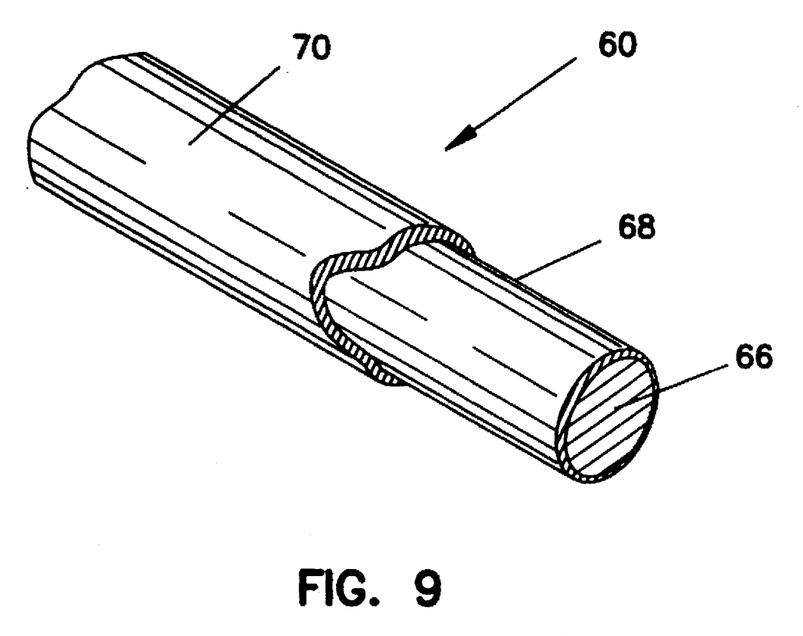
FIG. 9 shows a perspective view of a large core plastic optical fiber.

Referring now to FIG. 9, there is shown a typical large core plastic optical fiber (LCPOF) 60. The type of fiber 60 utilized employs illumination fiber optics, which is more effective at conducting large amounts of light over extended distances than fiber optics used for remote vision and telecommunications. The LCPOF 60 includes a transparent core portion of thermoset plastic 66. Around the transparent core is a Mylar cladding 68. The cladding 68 is surrounded by an outer polyethylene black opaque plastic jacket 70. This design reduces attenuation so that light may be conducted greater distances with minimal loss of brightness. In a preferred embodiment, the opaque jacket 70 is weather and sunlight resistant so that the LCPOF 60, which may be exposed from a light source to an emitting position, is protected under all conditions.

Figure 4:
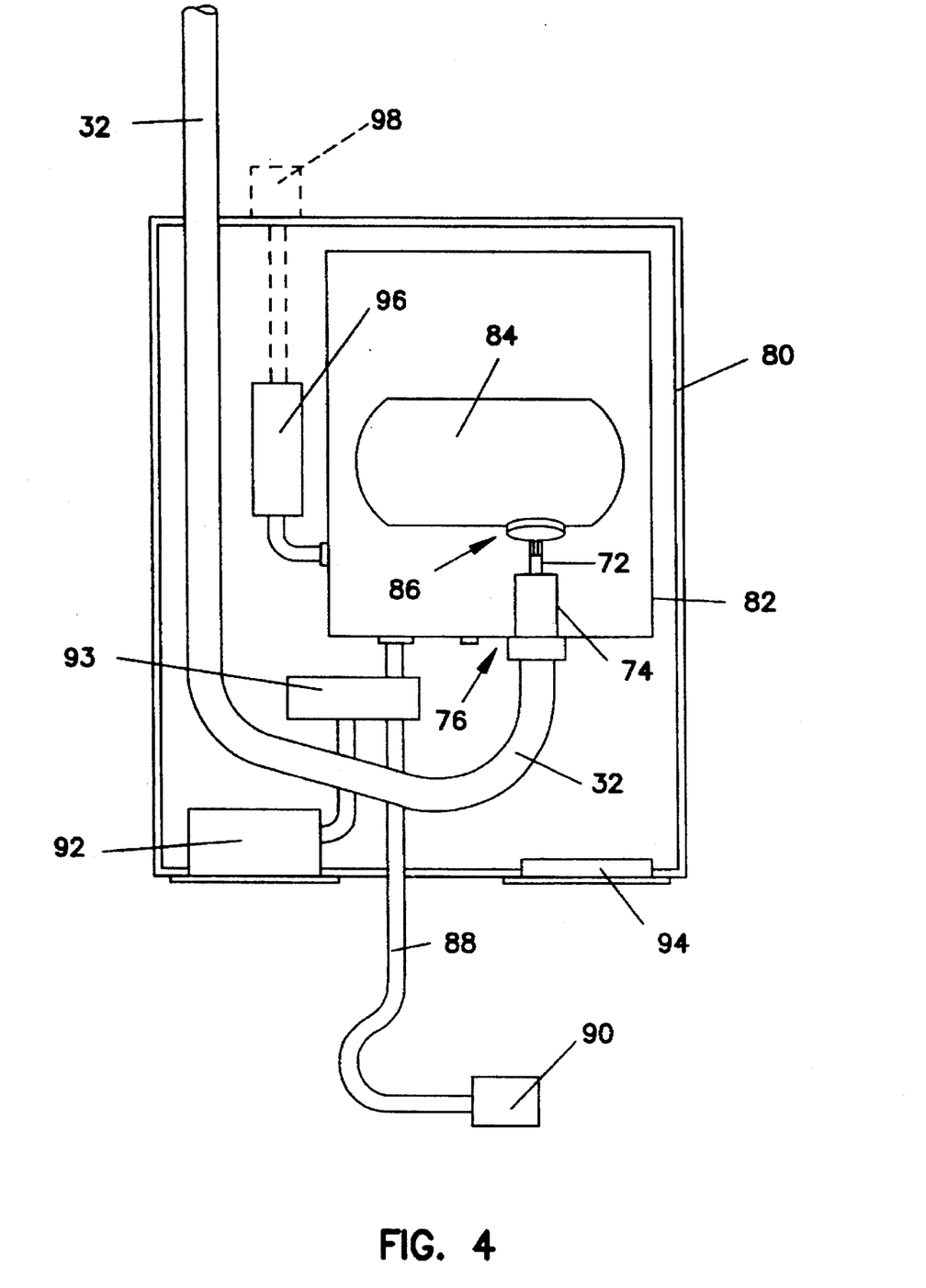
FIG. 4 shows a diagrammatic view of the light source for the lighting system shown in FIG. 1.
Figure 10:
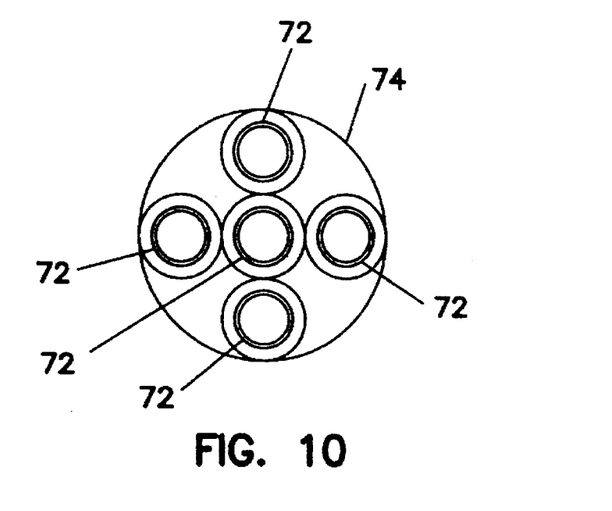
FIG. 10 shows an end view of a fiber optic bundle and harness.
Figure 11:
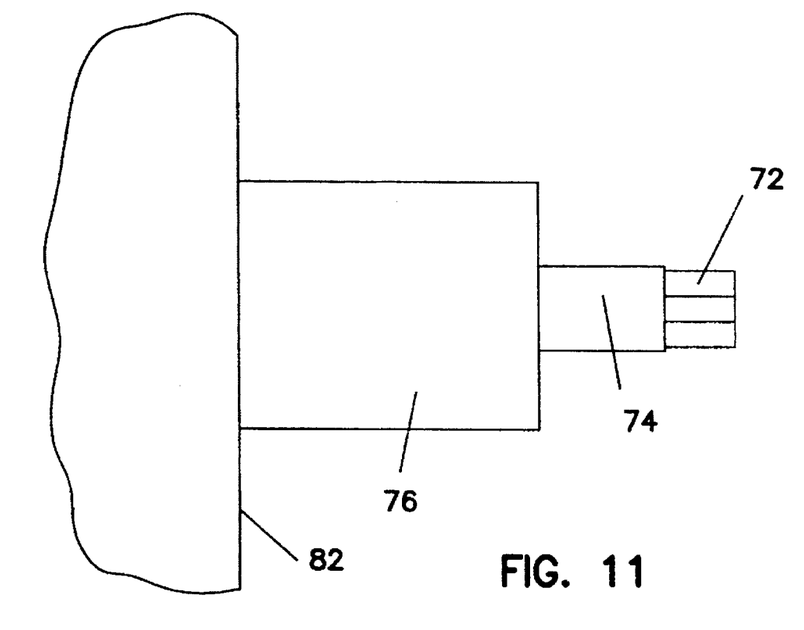
FIG. 11 shows a side view of the bundle and harness shown in FIG. 10.

As shown in FIG. 4, the light source 82 is placed in a weather resistant housing 80. The light source 82 includes a halide illuminator 84 shining through an illuminator focusing lens 86 to fiber accepting ends 72 of the optical fiber bundle 32, as shown in FIGS. 10 and 11. A harness 74 holds the LCPOF 60 so that approximately equal amounts of light fall onto each fiber. The harness 74 may be secured by a bracket 76 of the housing 80 as the bundle 32 leaves the housing 80. Referring again to FIG. 4, a power cable 88 delivers electricity from a power source to the light source 82. The power cable 88 also may include a quick twist connecter 90 for a simple connection to a provided source of power. The housing 80 may also include a fan 92 with an inlet 94 placed at the bottom of the housing 80. A switch or timer 96 may be used for turning the illuminator 84 on and off. A photocell 98 may also be used for detecting when conditions require lighting. In the preferred embodiment, the illuminator 84 is a zenon-metal halide illuminator. A power terminal block 93 distributes power to components within the weather resistant housing 80.

Figure 5:
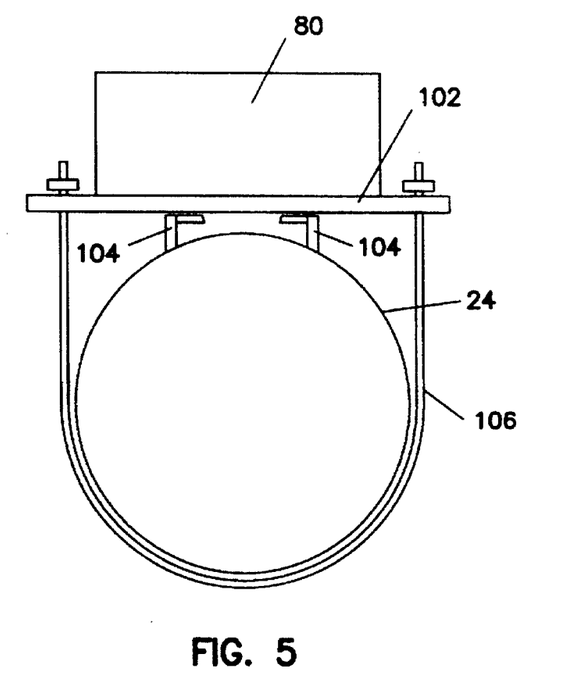
FIG. 5 shows a top sectional view of brackets for supporting the light source on a vertical sign support.
Figure 6:
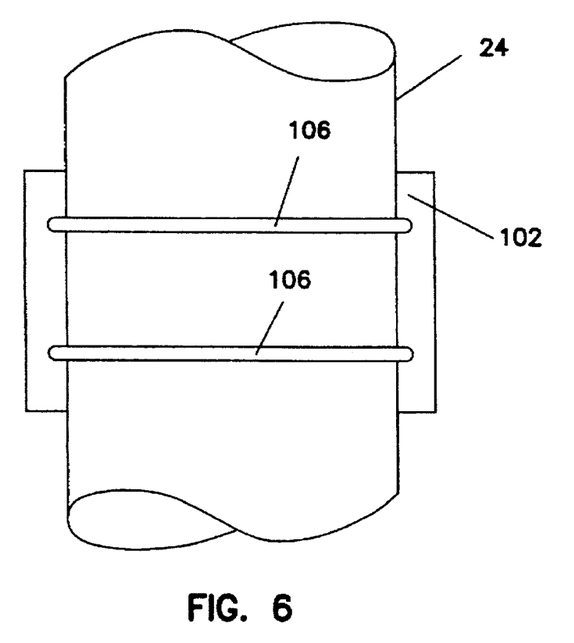
FIG. 6 shows a front elevational view of the brackets for supporting a light source shown in FIG. 5.

Referring to FIGS. 5 and 6, the light source housing 80 is typically mounted to the sign support post 24. In the preferred embodiment, the housing 80 is mounted to a mounting plate 102. The mounting plate 102 will have supporting angles 104 which engage sides of the support post 24. U-bolts 106 wrap around the post 24 and engage the mounting plate 102. In addition, security measures such as locks, may be added to prevent access or damage to the housing 80. The mounting system for the light source may be varied to suit different vertical supports.

Figure 7:
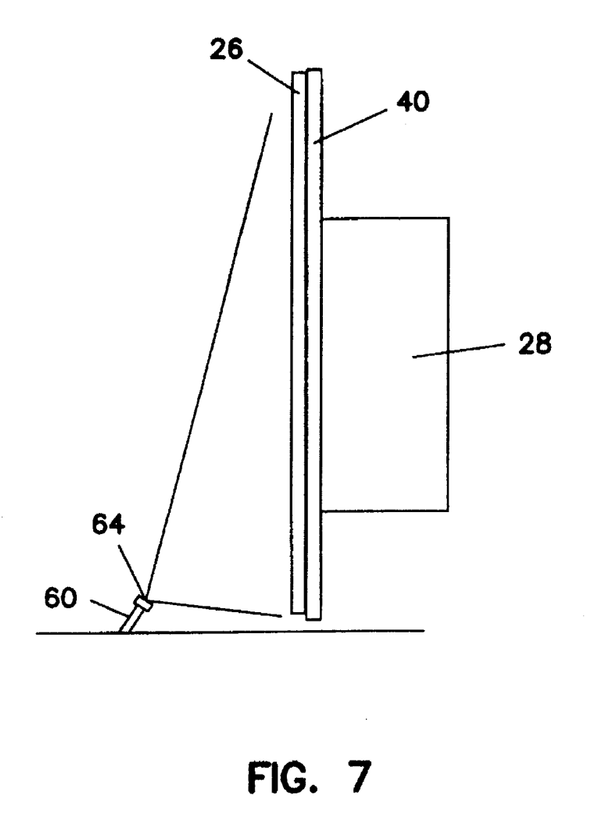
FIG. 7 shows a side diagrammatic view of a light emitting end and the light pattern on the reflective sign face.
Figure 8:
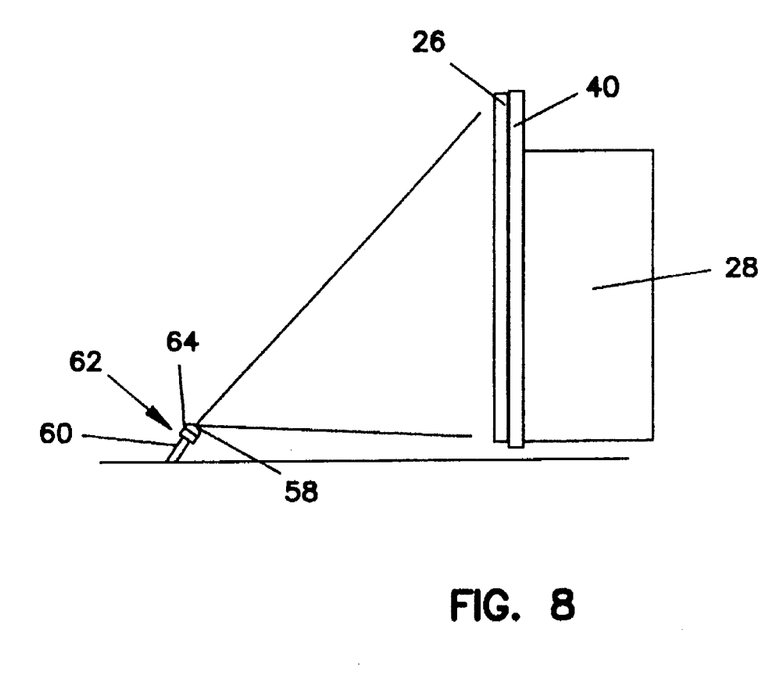
FIG. 8 shows a side diagrammatic view of a light emitting end equipped with a focusing lens and a narrowed light pattern on the sign.

Referring to FIGS. 7 and 8, there is shown the typical light spread for the sign panel 26 having reflective sheeting with the illumination system 20 of the present invention. It can be appreciated that in a standard large core plastic optical fiber, the light spread will encompass an angle of approximately 81°. However, when smaller signs are used, a focusing lens 58, as shown in FIG. 8, may be utilized which narrows the light pattern for a proper illumination pattern on the reflective surface of the sign face 26. It can be appreciated that the lens or lenses 58 provide flexibility for positioning emitting ends 62 and the pattern emitted from the emitting ends of the optical fibers 60.

Referring again to FIG. 1, it can be appreciated that signs may require more than one light emitter 62 for lighting the sign effectively. It can be appreciated that a single fiber bundle 32 may transport light from the light source 82 to the lighting position proximate the reflectively surfaced panel 26. The bundle 32 then can branch off individual LCPOF so that several optical fibers 60 may light a reflectively surfaced sign panel 26 or a group of sign panels 26. It can be appreciated that where several signs are used, several LCPOF may be encompassed in a single bundle 32 or multiple bundles 32. It can also be appreciated that depending on the design of the sign and the number of panels which must be illuminated, more than one light source 82 may also be required.

It can be appreciated that with the present invention, there are no bulbs overhead to fail, as occurred with prior overhead sign illuminating systems. The illuminator and bulbs are all placed proximate the ground for easy access. Therefore maintenance can be performed without workers having to access a level near the sign panels which are being illuminated. Since the optical fibers are very lightweight, and since no maintenance is required at the emitter end, no catwalks for maintenance and no support structure for supporting heavy lighting fixtures are required. Since the maintenance will take place at the light source, no lanes of traffic will need to be rerouted or closed. A reliable, weather resistant, low cost and easy to service lighting system is therefore provided. It can be further appreciated that reflective sheeting signs are particularly well suited to fiber optic technology as these signs require less light than other types of signs, such as outdoor billboards, which require more illumination than can practically be generated and conducted from a remote location.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for lighting sign panels surfaced with retro-reflective sheeting, comprising:
   a light source remote from the sign panels;
   a large core optical fiber having a first end and a second end, wherein the first end is remote from the sign and in optical communication with the light source and the second end is positioned before the retro-reflective sheeting; and,
   an adjustable bracket supporting the second end at a predetermined distance and at an adjustable angle to direct the second end at the sign panels and light the retro-reflective sheeting.

2. An apparatus according to claim 1, wherein the optical fiber includes a focusing lens at its second end, and wherein the focusing lens is supported on the adjustable bracket.

3. An apparatus according to claim 1, wherein the bracket extends below the sign panel and connects to a horizontal member which extends outward and away from the reflective sign surface to support the second end forward of the reflective sign surface.

4. An apparatus according to claim 1, further comprising means for splitting the light to transport light to a plurality of light emitting ends and wherein each of the plurality of light emitting ends includes an adjustable bracket supporting the corresponding light emitting end to direct the light emitting end at the sign panels.

5. An apparatus according to claim 1, wherein the adjustable bracket is lockable.

6. An apparatus for lighting overhead retro-reflectively surfaced sign panels, comprising:
   light generating means remote from the retro-reflective sign panels for generating light;
   a large core optical fiber for conducting light from the light generating means to the retro-reflective sign panels; and,
   means for positioning the light conducted to the reflective sign so as to directly illuminate the retro-reflective sign panels from light emitted from the large core optical fiber.

7. An apparatus according to claim 6, wherein the large core plastic optical conductor comprises a thermoset plastic core, cladding, and a polyethylene black opaque plastic jacket.

8. An apparatus according to claim 6, further comprising means for adjusting a position of a light emitting end of the optical conductor.

9. An apparatus according to claim 6, wherein the light generating means comprises a light source mounted on a vertical sign support accessible from ground level.

10. An apparatus according to claim 9, wherein the light source is mounted in a weathertight enclosure.

11. An apparatus for lighting overhead reflectively surfaced sign panels, comprising:
    illumination means remote from signs;
    a large core plastic optical fiber for transporting light from the illumination means to the reflective sign panels, having a receiving end at the illumination means and an emitting end positioned before the sign; and,
    means for positioning the emitting end so as to illuminate the reflectively surfaced sign panels.

12. An apparatus according to claim 11, further comprising means for restricting spread of light at the emitting end.

13. An apparatus according to claim 11, wherein the illumination means comprises a Xenon-Metal Halide Illuminator.

14. An apparatus according to claim 11, wherein one or more of the large core plastic optical fibers are harnessed to direct light to a plurality of light emitting ends.

15. An overhead lighted sign apparatus, comprising:
    a substantially vertical panel having a retro-reflective front surface;
    a panel mounting post extending vertically on a rear side of the panel;
    a light source remote from the panel;
    a large core optical fiber conducting light from the light source to a position before the front surface, the large core optical fiber including a first end receiving light from the light source and a second end emitting light to the front surface;
    a frame attached to the panel mounting post and extending before and below the front surface; and,
    an adjustable lockable bracket mounted on the frame, the bracket supporting the second end of the large core optical fiber to direct conducted light onto the front surface.

16. A sign according to claim 15, wherein the large core optical fiber comprises a fiber splitting into a plurality of second ends and a corresponding plurality of brackets supporting the plurality of second ends to direct light onto the front surface.

17. A sign according to claim 15, further comprising a focusing lens at the second end of the large core optical fiber intermediate the front surface and the second end of the large core optical fiber.

18. A sign according to claim 17, wherein the focusing lens is supported on the bracket.

* * * * *